United States Patent [19]

Yoshida et al.

[11] Patent Number: 5,430,624
[45] Date of Patent: Jul. 4, 1995

[54] MOUNTING STRUCTURE FOR A VANITY MIRROR

[75] Inventors: Yoshihide Yoshida; Atsushi Yamada, both of Shimizu, Japan

[73] Assignee: Koito Manufacturing Co., Ltd., Tokyo, Japan

[21] Appl. No.: 249,954

[22] Filed: May 27, 1994

[30] Foreign Application Priority Data

May 31, 1993 [JP] Japan ............................ 5-033451 U
Mar. 29, 1994 [JP] Japan ............................ 6-081155

[51] Int. Cl.6 ............................................. B60Q 3/02
[52] U.S. Cl. ................................... 362/74; 362/135; 439/558; 439/801
[58] Field of Search .............. 362/74, 135; 439/558, 439/564, 801, 444, 680

[56] References Cited

U.S. PATENT DOCUMENTS

| | | | |
|---|---|---|---|
| 2,417,718 | 3/1947 | Tinnerman | 439/801 |
| 4,323,879 | 4/1982 | Kelley | 439/801 |
| 4,764,852 | 8/1988 | Sakuma . | |
| 4,909,562 | 3/1990 | Sakuma et al. . | |
| 5,003,438 | 3/1991 | Yoshida . | |
| 5,022,699 | 6/1991 | Yoshida . | |
| 5,029,052 | 7/1991 | Sakuma et al. . | |
| 5,117,337 | 3/1992 | Sakuma . | |
| 5,184,888 | 2/1993 | Sakuma et al. . | |
| 5,207,501 | 5/1993 | Sakuma et al. . | |

*Primary Examiner*—Ira S. Lazarus
*Assistant Examiner*—Sara Sachie Raab
*Attorney, Agent, or Firm*—Koda and Androlia

[57] ABSTRACT

A mounting structure for a vanity mirror includes two screw penetration holes formed in a lamp section of the vanity mirror; positive and negative contacts for supplying a light source in the lamp section with electricity, the positive and negative contacts being formed with through holes and being disposed such that each of the through holes formed in the positive and negative contacts is aligned with a corresponding one of the screw penetration holes of the lamp section; two contacts provided on a sun visor and connected to a power source, the sun visor-side contacts being formed with through holes and being positioned such that each of the through holes of the sun visor-side contacts is aligned with a corresponding one of the screw holes in bosses of the sun visor which are located at positions corresponding to the screw penetration holes of the lamp section; and two mounting screws made of a conductive material which are passed through the through holes of the contacts of the lamp section, the screw penetration holes of the vanity mirror and the through holes of the contacts on the sun visor, in this order, and are screwed to the screw holes in the sun visor, whereby the contacts of the lamp section and the contacts on the sun visors are electrically connected with each other through the mounting screws. Accordingly, the structure for supplying electricity to the lamp section of the vanity mirror is simplified.

13 Claims, 8 Drawing Sheets

MOUNTING STRUCTURE FOR A VANITY MIRROR

BACKGROUND OF THE INVENTION

1. Field of the Invention

The present invention relates to a new mounting structure for a vanity mirror. In particular, the present invention relates to a mounting structure for mounting a vanity mirror to a sun visor, and provides a novel mounting structure for a vanity mirror in which a simplified structure for supplying electricity to a lamp section provided in the vanity mirror is achieved.

2. Description of the Related Art

Some vanity mirrors used in automobiles are designed to be mounted to sun visors.

Also, some vanity mirrors are provided with a lamp section for use in darkness such as at night. In such vanity mirrors, electricity is supplied to the lamp section through a connector provided in the vanity mirror.

In the case where electricity is supplied to the lamp section of a vanity mirror through a connector, a coupling work for the connector is required when the vanity mirror is mounted to a sun visor. Also, necessity of such a connector causes an increase in costs.

SUMMARY OF THE INVENTION

An object of the present invention is to provide a mounting structure for a vanity mirror in which the structure for supplying electricity to a lamp section of the vanity mirror is simplified.

Another object of the present invention is to provide a mounting structure for a vanity mirror which facilitates the mounting of a vanity mirror to a sun visor.

Still another object of the present invention is to provide a mounting structure for a vanity mirror in which the number of parts is reduced, thereby minimizing the costs.

To achieve the above-described objects, the present invention provides a mounting structure for a vanity mirror which includes two screw penetration holes formed in a lamp section of the vanity mirror; positive and negative contacts for supplying a light source in the lamp section with electricity, the positive and negative contacts being formed with through holes and being disposed such that each of the through holes formed in the positive and negative contacts is aligned with a corresponding one of the screw penetration holes of the lamp section; two contacts provided on a sun visor and connected to a power source, the sun visor-side contacts being formed with through holes and being positioned such that each of the through holes of the sun visor-side contacts is aligned with a corresponding one of the screw holes in the sun visor which are located at positions corresponding to the screw penetration holes of the lamp section; and two mounting screws made of a conductive material which are passed through the through holes of the contacts of the lamp section, the screw penetration holes of the vanity mirror and the through holes of the contacts on the sun visor, in this order, and are screwed to the screw holes in the sun visor, whereby the contacts of the lamp section and the contacts on the sun visors are electrically connected with each other through the mounting screws.

Further, the present invention provides a mounting structure for a vanity mirror which includes two screw penetration holes formed in a lamp section of the vanity mirror; positive and negative contacts for supplying a light source in the lamp section with electricity, the positive and negative contacts being formed with through holes and being disposed such that each of the through holes formed in the positive and negative contacts is aligned with a corresponding one of the screw penetration holes of the lamp section; two contacts provided on a sun visor and connected to a power source, the sun visor-side contacts being formed with through holes and being positioned such that each of the through holes of the sun visor-side contacts is aligned with a corresponding one of the nuts fixed to the sun visor; and two mounting screws made of a conductive material which are passed through the through holes of the contacts of the lamp section, the screw penetration holes of the vanity mirror and the through holes of the contacts on the sun visor, in this order, and are screwed to the nuts on the sun visor, whereby the contacts of the lamp section and the contacts on the sun visors are electrically connected with each other through the mounting screws.

Moreover, the present invention provides a mounting structure for a vanity mirror which includes two screw penetration holes formed in a lamp section of the vanity mirror; positive and negative contacts for supplying a light source in the lamp section with electricity, the positive and negative contacts being formed with through holes and being disposed such that each of the through holes formed in the positive and negative contacts is aligned with a corresponding one of the screw penetration holes of the lamp section; the nuts being attached to a sun visor via two contacts connected to a power source to be positioned at positions corresponding to the screw penetration holes of the lamp section; and two mounting screws made of a conductive material which are passed through holes of the contacts of the lamp section, the screw penetration holes of the vanity mirror and the through holes of the contacts on the sun visor, in this order, and are screwed to the nuts on the sun visor, whereby the contacts of the lamp section and the contacts on the sun visors are electrically connected with each other through the mounting screws.

Accordingly, in the mounting structure for a vanity mirror according to the present invention, electrical connection between a lamp section of a vanity mirror and a sun visor is automatically carried out as a part of work for attaching the vanity mirror to the sun visor. Therefore, work for mounting the vanity mirror to the sun visor can be simplified. Further, it is possible to reduce the number of parts, thereby lowering the production costs of the vanity mirror.

DETAILED DESCRIPTION OF THE PREFERRED EMBODIMENTS

The mounting structure for a vanity mirror according to the present invention will be described below by way of embodiments shown in the attached drawings.

First Embodiment

FIG. 1 through FIG. 8 show a first embodiment of the mounting structure for a vanity mirror according to the present invention. In this embodiment, a sun visor is formed with bosses to which contacts to be placed on the sun visor (hereinafter referred to as "sun visor-side contacts") are attached.

It is to be noted that directions mentioned herein are directions in the state where a sun visor is in its swing down position for use.

Figure 1:
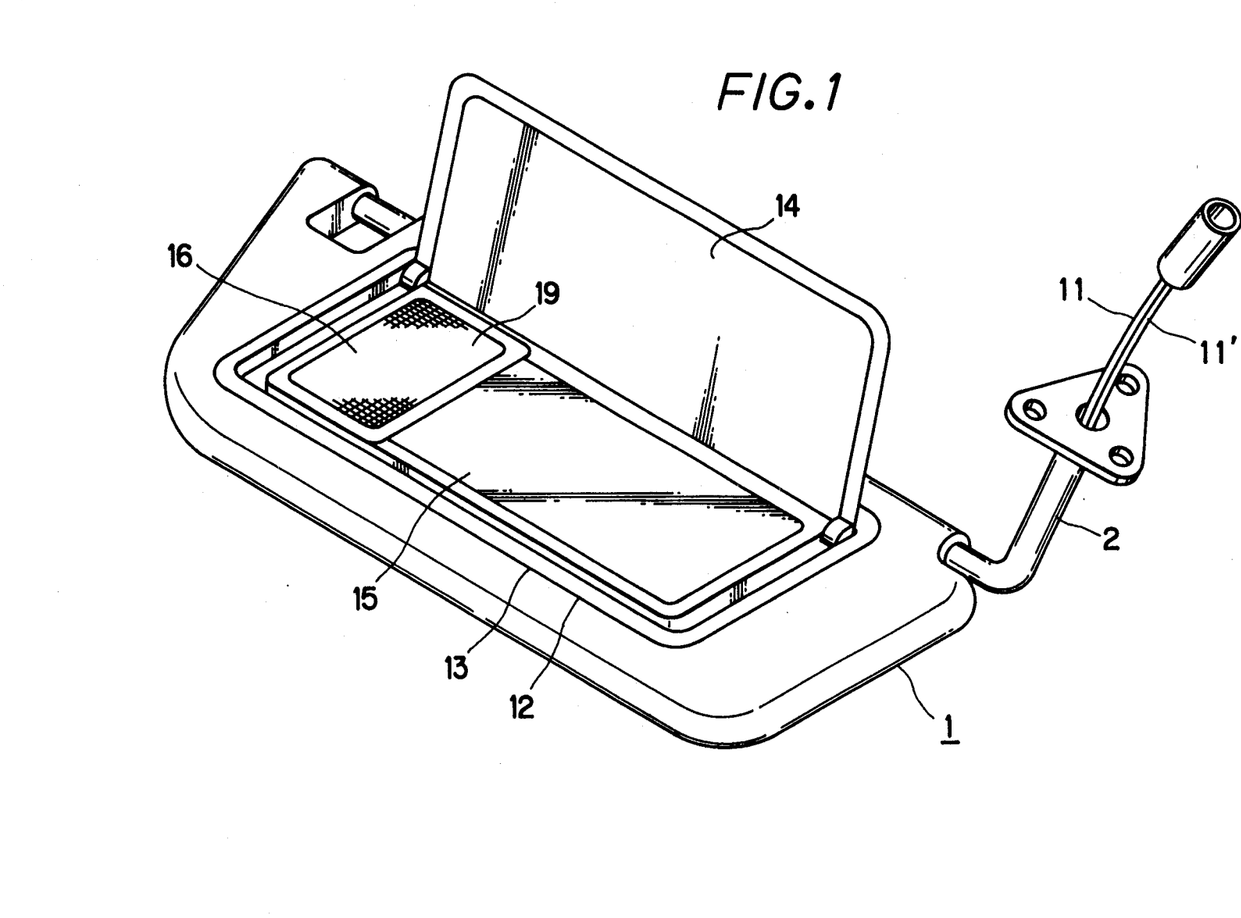
FIG. 1 is a perspective view showing, together with FIG. 2 through FIG. 8, a first embodiment of the mounting structure for a vanity mirror according to the present invention.
Figure 2:
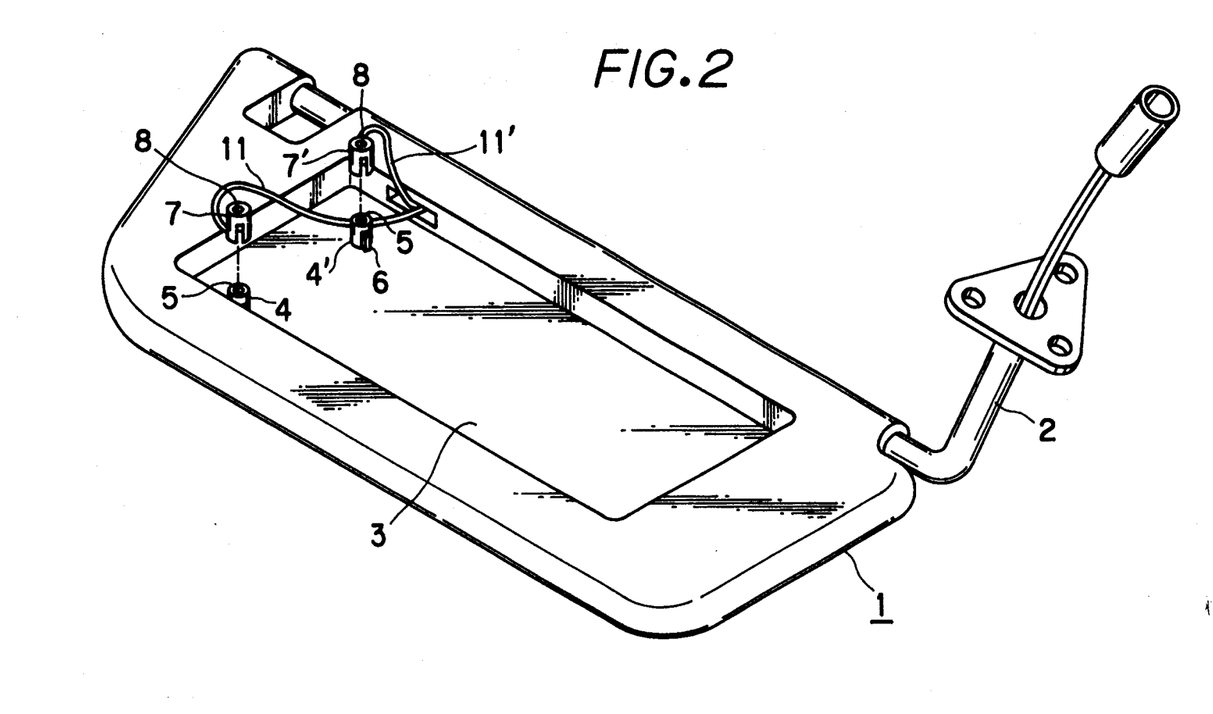
FIG. 2 is a perspective view showing a sun visor in a state where the vanity mirror is removed therefrom.

In FIG. 1, numeral 1 denotes a sun visor which is rotatably supported at the upper end portion by a tubular stay 2. The stay 2 is fixed to the upper portion in a passenger room of an automobile.

Numeral 3 denotes a depression formed on one side of the sun visor 1, and a vanity mirror which will be described later is disposed in the depression 3 and is fixed to the sun visor 1.

Figure 3A:
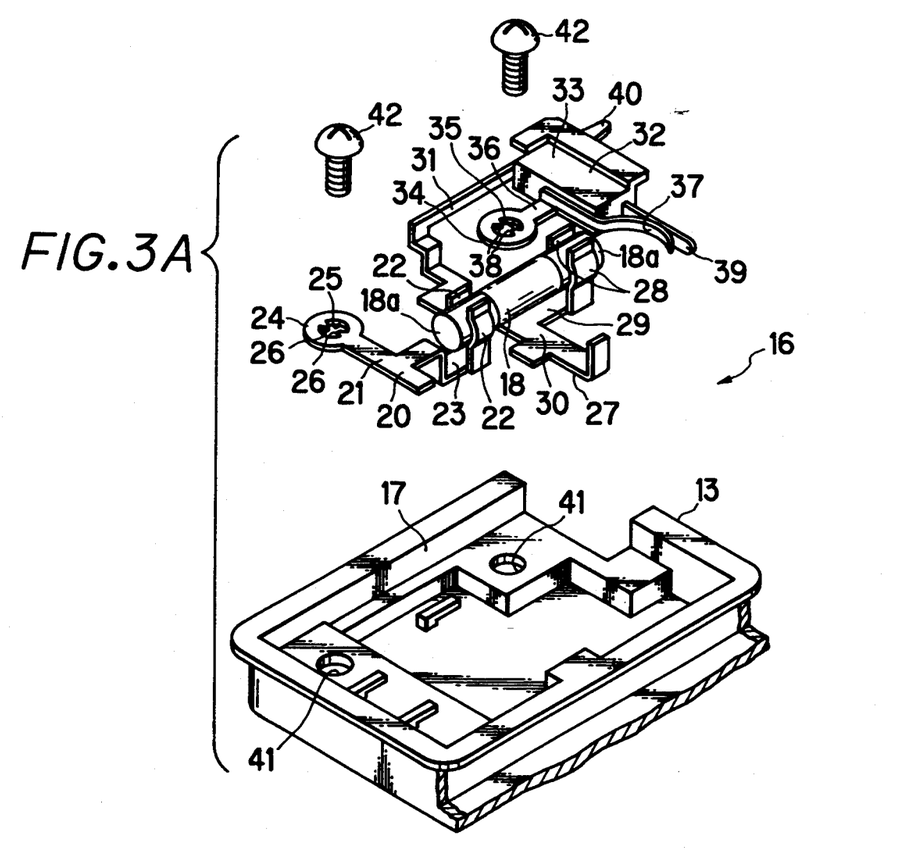
FIG. 3A is an enlarged perspective view showing the lamp section of the vanity mirror in an exploded state.
Figure 3B:
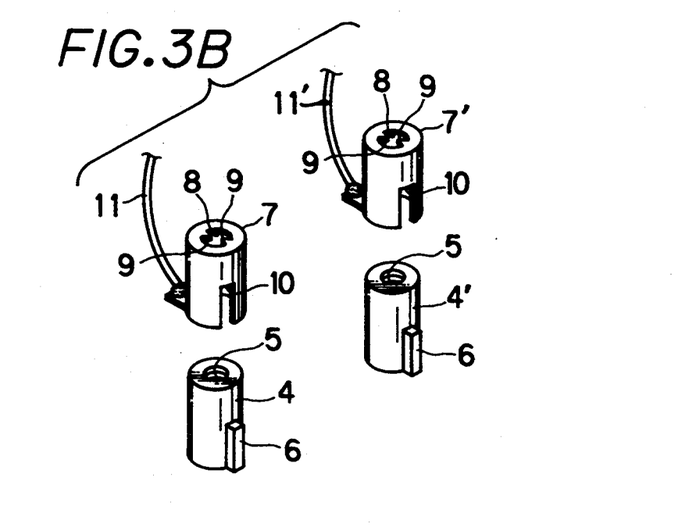
FIG. 3B is an enlarged perspective view showing contacts and bosses in an exploded state.

Numerals 4 and 4' denote bosses projected from the bottom surface of the above-mentioned depression 3. Screw holes 5 and 5 are tapped from the end surfaces of the bosses 4 and 4'. Numeral 6 denotes ribs projected from the outer side surfaces of the bosses 4 and 4' at locations near the bases thereof.

Numerals 7 and 7' denote contacts of a roughly cylindrical shape having a bottom. The bottom portions of the contacts 7 and 7' are formed at their centers with through holes 8. Contact claws 9 are projected from two opposing positions on the periphery of each through hole 8 in inward directions to approach with each other.

Also, the side walls of the contacts 7 and 7' are formed with slits 10 extending from the opening ends to the axially intermediate positions of the side walls.

Numerals 11 and 11' denote conductors which pass through the aforementioned stay 2. The one ends of the conductors 11 and 11' are connected to the contacts 7 and 7', respectively, while the other ends of the conductors 11 and 11 are taken out from the mounting end of the stay 2.

The above-described contacts 7 and 7' are fitted onto the bosses 4 and 4' of the sun visor 1 such that their slits 10 are engaged with the ribs 6 of the bosses 4 and 4' to prevent the rotation of the contacts 7 and 7 relative to the bosses 4 and 4'.

Thus, the through holes 8 of the contacts 7 and 7' are aligned with the screw hole 5 of the bosses 4 and 4'.

Numeral 12 denotes a vanity mirror placed in the depression 3 of the sun visor 1. The vanity mirror 12 is provided with a body 13 and a cover 14 which is supported by the body 13 to be freely opened and closed. The body 13 supports a mirror 15 and has a lamp section 16 adjacent to the mirror 15.

The lamp section 16 is formed in a depression 17 formed by the side of the location at which the mirror 15 is arranged. The lamp section 16 is composed of a lamp 18 disposed in the depression 17, and a lens 19 covering the opening of the depression 17.

Numeral 20 denotes a contact made by forming a conductive plate with a press. The contact 20 has a support portion 21 held on the lower portion of the bottom surface of the depression 17, a holder portion 23 extending upward from the support portion 21 and having two holding claws 22 extending toward the opening of the depression 17 from both lateral edges of the upper end portion of the holder portion 23, and a connecting section 24 extending from one of side edges of the support portion 21. The connecting section 24 is formed with a screw penetration hole 25.

Contact claws 26 are projected from two opposing positions on the periphery of the screw penetration hole 25 in inward directions to approach with each other.

Numeral 27 denotes another contact disposed in the aforementioned depression 17. The contact 27 is formed from a conductive plate so as to integrally form a main portion 30 provided with a holder portion 29 having two holding claws 28, and a connecting section 31 extending upward from one of the side edges of the main portion 30.

Numeral 32 denotes a switch disposed at one side of the upper portion of the depression 17. The switch 32 has a case 33 into which the upper end portion of the connection section 31 of the contact 27 is inserted.

Numeral 34 denotes a still another contact disposed in the depression 17. The contact 34 is formed from a conductive plate such that a main portion 36 having a screw penetration hole 35, and a contact section 37 extending from the main portion 36 are integrally formed. Also, contact claws 38 are projected from two opposing positions on the periphery of the screw penetration hole 35 of the main portion 36 in inward directions to approach with each other.

Numeral 39 denotes a contact piece which is partially projected from the case 33 of the switch 32. The tip portion of the contact section 37 of the contact 34 is resiliently contacted with the contact piece 39.

An operation rod 40 is projected upward from the upper surface of the case 33 of the switch 32 and is resiliently urged to move upward.

When the operating rod 40 is in the protruded position, electrical connection between the connection section 31 of the contact 27 and the contact piece 39 is broken. When the operating rod 40 is pushed inward into the case 33, electrical connection between the connection section 31 and the contact piece 39 is established. When the aforementioned cover 14 is opened, the operating rod 40 is pushed into the case 33. On the contrary, when the cover 14 is closed, the operating rod 40 is projected upward.

The lamp 18 has caps 18a at its both ends, and the caps 18a are held by the holding section 23 of the contact 20 and the holding section 29 of the contact 27, respectively.

Thus, the screw penetration hole 25 of the contact 20 and the screw penetration hole 35 of the contact 34 are positioned to be aligned with the through holes 41 formed in the body 13 at the locations within the depression 17.

Figure 4:
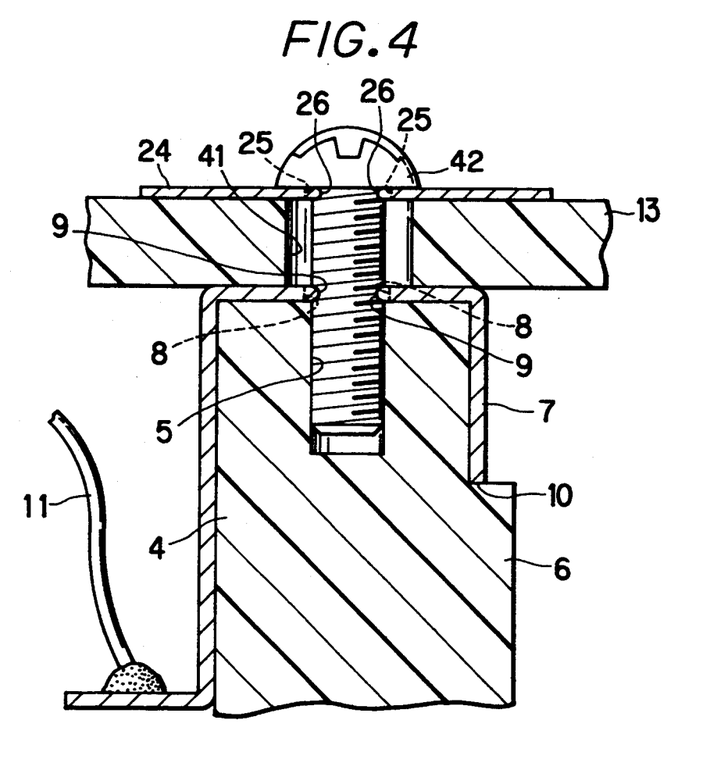
FIG. 4 is an enlarged sectional view of a major part of the mounting structure.

Numeral 42 denotes mounting screws made of a conductive material.

The mounting screws 42 are passed through the screw penetration holes 25 and 35 of the contacts 20 and 34, the through holes 41 of the body 13, and the through holes 8 of the contacts 7 and 7' in this order, and are screwed to the screw holes 5 of the bosses 4 and 4' formed on the sun visor 1.

With this structure, the vanity mirror 12 is fixed to the sun visor 1 to be in the depression 3. Simultaneously, the contact 20 in the lamp section 16 and the contact 7 on the sun visor 1 are electrically connected with each other via one of the mounting screws 42 while the contact 34 in the lamp section 16 and the contact 7' on the sun visor 1 are electrically connected with each other via the other mounting screw 42.

Since the screw penetration holes 8 of the contacts 7 and 7', the screw penetration hole 25 of the contact 20, and the screw penetration hole 35 of the contact 34 are formed with the contact claws 9, 26 and 38, respectively, these claws strongly engage or bite into the root portions of threads of the mounting screws 42 when the mounting screws 42 are attached. This secures the electrical contacts between the mounting screws 42 and contacts 7, 7', 20 and 34.

In the case where the screw penetration holes 8, 25, 35 are formed to have a diameter smaller than the crest diameter of the mounting screws 42 but larger than the root diameter of the mounting screws 42, the edges of the screw penetration holes 8, 25, 35 securely contact the threads of the mounting screws 42 without forming the above-described contact claws 9, 26 and 38.

Figure 5:
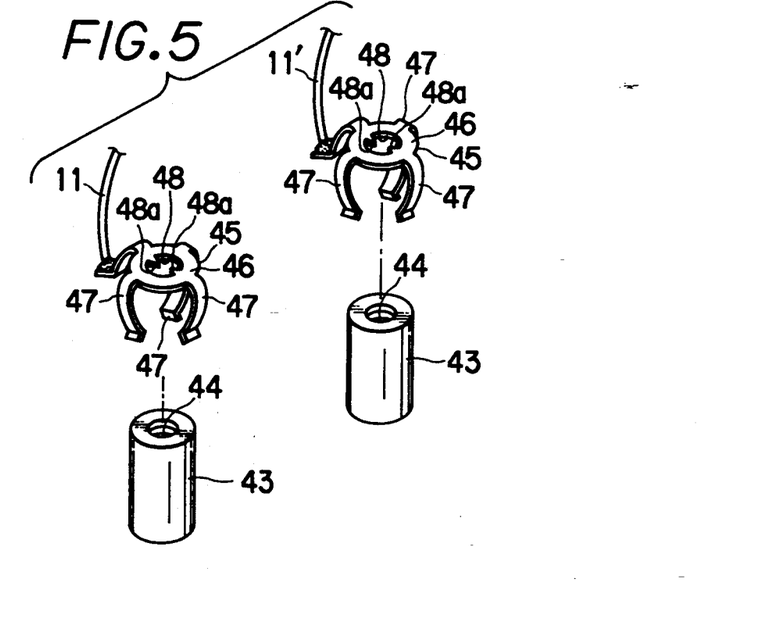
FIG. 5 is a perspective view of contacts and bosses in an exploded state which shows a modified example.
Figure 6:
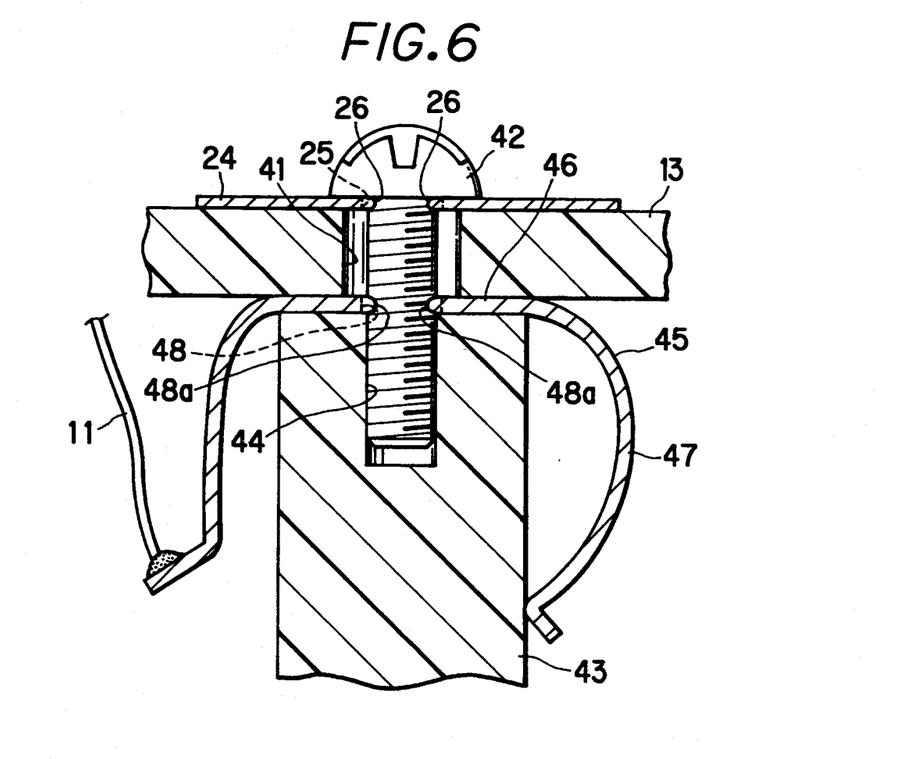
FIG. 6 is an enlarged sectional view of one of the contacts and one of the bosses shown in FIG. 5.

FIG. 5 and FIG. 6 show a modification of the sun visor-side contacts and the bosses provided on the sun visor 1.

Bosses 43 have a roughly cylindrical shape, and screw holes 44 are tapped from the end surfaces thereof.

Each of contacts 45 is made of a conductive material and has a main portion 46 having a nearly disk-like shape, and three leg portions 47 extending in the same direction from roughly equally spaced three positions on the peripheral edge of the main portion 46. Each of the leg portions 47 is curved to have a wavy shape. The main portion 46 is formed with a screw penetration hole 48. Numeral 48a denotes contact claws formed at each of the screw penetration holes 48.

When the contacts 45 are fitted onto the bosses 43, the main portions 46 are placed on the end surfaces of the bosses 45 so that the screw penetration holes 48 thereof are aligned with the screw holes 44 of the bosses 43 while the leg portions 47 thereof are resiliently contacted with the outer side surfaces of the bosses 43.

Figure 7:
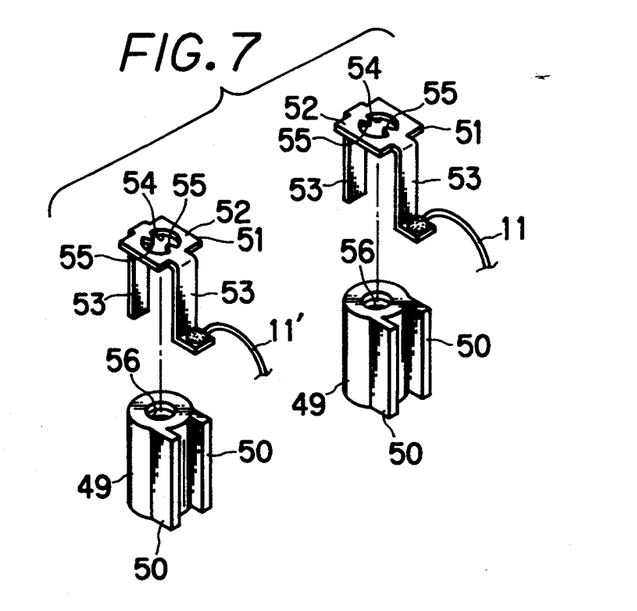
FIG. 7 is a perspective view of contacts and bosses in an exploded state which shows another modified example.
Figure 8:
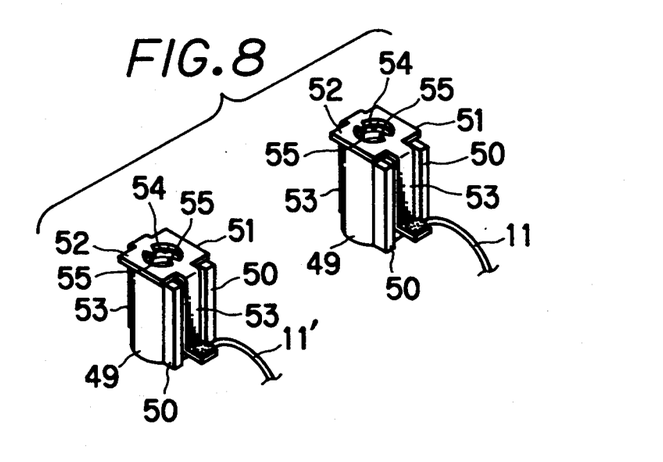
FIG. 8 is a perspective view of the contacts and the bosses shown in FIG. 7 in an assembled state.

FIG. 7 and FIG. 8 show another modification of the sun visor-side contacts and the bosses provided on the sun visor 1.

In this modification, two parallel walls 50 extending in the axial direction are projected from the outer side surfaces of bosses 49 each having a roughly cylindrical shape.

Each of contacts 51 is made of a conductive material and has a base portion 52 and two leg portions 53. The leg portions 53 extend in the same direction from two opposing positions on the edge of the main portion 52. The main portion 52 is formed with a screw penetration hole 54. Two contact claws 55 are formed at each of the screw penetration holes 54.

The main portion 52 of each contacts 51 is placed on the end surface of one of the bosses 49 so that one of the leg portions 53 is resiliently contacted with the outer side surface of the boss 49 while the other leg portion 53 is located between the two projected walls 50. Thus, the screw penetration holes 54 of the main portions 52 are aligned with the screw holes 56 tapped from the end surfaces of the bosses 49.

Second Embodiment

Figure 9:
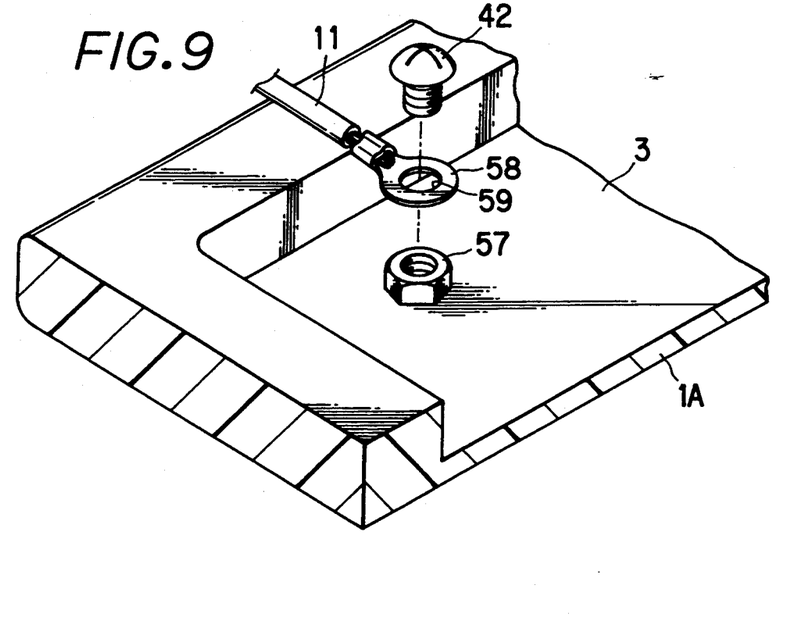
FIG. 9 is a perspective view showing, together with FIG. 10 through FIG. 12, a second embodiment of the mounting structure for a vanity mirror according to the present invention, in which a nut and a contact on a sun visor are shown.

FIG. 9 shows a second embodiment of the mounting structure for a vanity mirror according to the present invention. In this embodiment, nuts made of a conductive material are fixed to a sun visor, and sun visor-side contacts are attached to the nuts.

Since the second embodiment differs from the first embodiment in members on a sun visor in which screw holes are formed, and the shapes of sun visor-side contacts, only the major portion is shown in the drawings, and description is therefore focused on the above-described difference. Regarding the remaining portion, elements which are the same as those in the mounting structure for a vanity mirror according to the aforementioned first embodiment are denoted by the same reference symbols, and explanation thereof will be omitted.

Although a combination of a nut fixed to a sun visor 1A and a contact for the nut is provided for each of plus wiring and minus wiring, one of the combinations is shown and is described because each combination has the same structure.

Numeral 57 denotes a nut bonded with an adhesive to the bottom surface of a depression of the sun visor 1A.

Numeral 58 denotes a contact composed of a so-called round type terminal, and a code 11 is connected to the contact 58.

Each mounting screw 42 is passed through a screw penetration hole 25 or 35 of a contact 20 or 34 of a lamp section 17, a through holes 41 of a body 13, and a screw penetration hole 59 of the contact 58 on the sun visor 1A in this order, and is screwed to the nut 57 on the sun visor 1A.

With this structure, a vanity mirror 12 is fixed to the sun visor 1A to be in a depression 3 thereof. Simultaneously, the contact 20 in the lamp section 16 and one of the contacts 58 on the sun visor 1A are electrically connected with each other via one of the mounting screws 42 while the contact 34 in the lamp section 16 and the other contact 58 on the sun visor 1A are electrically connected with each other via the other mounting screw 42.

Figure 10:
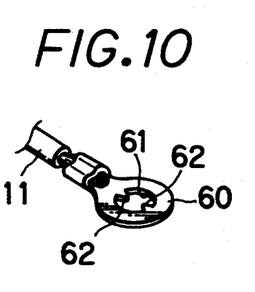
FIG. 10 is a perspective view showing a modification of the contact on the sun visor.

FIG. 10 shows a modification of the contact on the sun visor 1A according to the second embodiment.

A contact 60 used here is a round type terminal in which contact claws 62 are projected from two opposing positions on the periphery of a screw penetration hole 61 of the contact 60 in inward directions to approach with each other. The above-described code 11 is connected to the contact 60.

Figure 11:
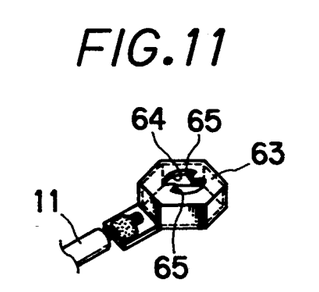
FIG. 11 is a perspective view showing another modification of the contact on the sun visor.

When this contact 60 is used, the contact claws 62 strongly engage or bite into the root portion of the thread of each mounting screw 42, thereby securing the electrical contacts between the mounting screws 42 and contacts 60, 20 and 34. FIG. 11 shows another modification of the contact on the sun visor 1A according to the second embodiment.

A contact 63 used here is flat and has a hexagonal and cylindrical shape having a bottom, and a screw penetration hole 64 is formed at the center of the bottom portion thereof. Contact claws 65 are projected from two opposing positions on the periphery of the screw penetration hole 64 in inward directions to approach with each other. The above-described code 11 is connected to the contact 63.

The inside shape of the contact 63 has dimensions equal to or slightly larger than the outer shape of the nut 57 fixed to the sun visor 1A.

When the contact 63 is fitted onto the nut 57 on the sun visor 1A, the contact 63 is prevented from rotating relative to the nut 57, and the screw penetration hole 64 of the contact 63 is aligned with a screw hole of the nut 64.

When this contact 63 is used, the contact claws 65 strongly engage or bite into the root portion of the thread of each mounting screw 42, there by securing the electrical contacts between the mounting screws 42 and contacts 63, 20 and 34. In addition, since the contact 63 can be temporarily fixed to the nut 57, the assembly of the vanity mirror 12 to the sun visor 1A can be facilitated.

Figure 12:
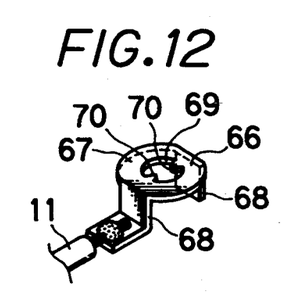
FIG. 12 is a perspective view showing still another modification of the contact on the sun visor.

FIG. 12 shows another modification of the contact on the sun visor 1A according to the second embodiment.

A contact 66 is made of a conductive material and has a base portion 67 having an oval shape and two leg portions 68. The leg portions 68 extend in the same direction from two opposing positions on the edge of the main portion 67. The main portion 67 is formed with a screw penetration hole 69. Two contact claws 70 are formed at each of the screw penetration holes 69. The aforementioned conductor 11 is connected to one of the leg portions 68.

The main portion 67 of the contact 66 is placed on the end surface of the nut 57 so that the leg portions 68 are resiliently contacted with two opposite outer side surfaces of the nut 57 while the screw penetration hole 69 of the main portion 67 is aligned with the screw hole of the nut 57.

When this contact 66 is used, the claws 70 strongly engage or bite into the root portion of the thread of each mounting screw 42, similarly to the above-mentioned contact 63, thereby securing the electrical contacts between the mounting screws 42 and contacts 66, 20 and 34. In addition, since the contact 66 can be temporarily fixed to the nut 57, the assembly of the vanity mirror 12 to the sun visor 1A can be facilitated.

Third Embodiment

Figure 13:
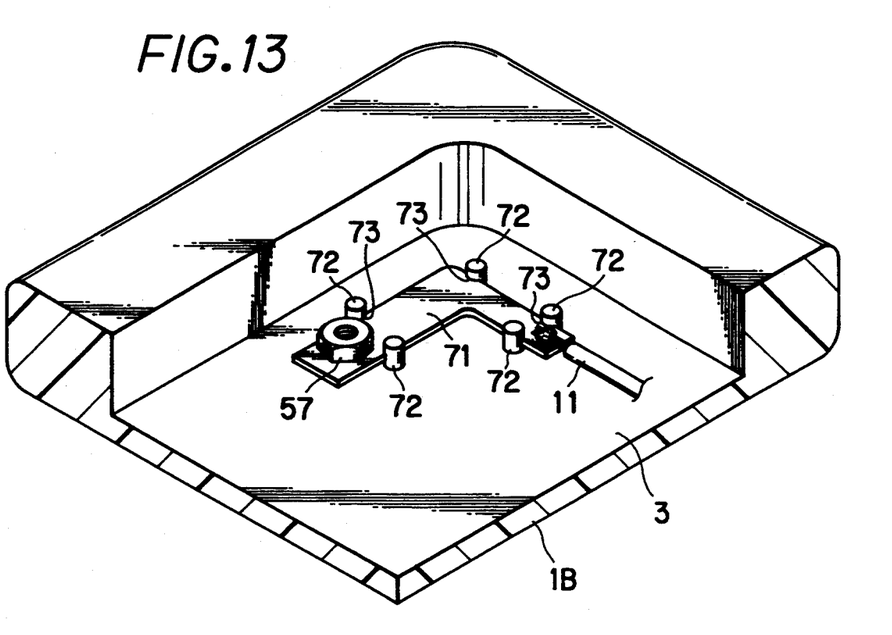
FIG. 13 is a perspective view showing a third embodiment of the mounting structure for a vanity mirror according to the present invention, in which a contact and a nut on a sun visor are shown.

FIG. 13 shows a third embodiment of the mounting structure for a vanity mirror according to the present invention. In this embodiment, nuts made of a conductive material is welded on a flat contact, and the flat contact is fixed to a sun visor.

Since the third embodiment differs from the first embodiment in members on a sun visor in which screw holes are formed, and the shapes of sun visor-side contacts, only the major portion is shown in the drawings, and description is therefore focused on the above-described difference. Regarding the remaining portion, elements which are the same as those in the mounting structure for a vanity mirror according to the aforementioned first embodiment are denoted by the same reference symbols, and explanation thereof will be omitted.

Although a combination of a nut provided on a sun visor 1B and a contact for the nut is provided for each of plus wiring and minus wiring, one of the combinations is shown and is described because each combination has the same structure.

Numeral 71 denotes a flat contact having two arm portions to form a nearly L-like shape as viewed from above. A nut 57 is spot-welded on the end portion of one of the arm portions of the contact 71, and the aforementioned conductor 11 is connected to the other arm portion.

The contact 71 is engaged with engagement grooves 73 formed in protrusions 72 protruded from the bottom surface of a depression 3 of the sun visor 1B so that the contact 71 is assembled on the sun visor 1B.

Each mounting screw 42 is passed through a screw penetration hole 25 or 35 of a contact 20 or 34, and a through hole 41 of a body 13 in this order, and is screwed to the nut 57 fixed to the sun visor 1B via the contact 71.

With this structure, a vanity mirror 12 is fixed to the sun visor 1B to be in the depression 3 thereof. Simultaneously, the contact 20 in the lamp section 16 and one of the contacts 71 on the sun visor 1B are electrically connected with each other via one of the mounting screws 42 and the nuts 57 while the contact 34 in the lamp section 16 and the other contact 71 on the sun visor 1B are electrically connected with each other via the other mounting screw 42 and the nut 57.

By using the above described contact 71 and nut 57, the assembly of the lamp section 16 can be simplified, because each mounting screw 42 is required only to pass through a screw penetration hole 25 or 35 of a contact 20 or 34, and a through hole 41 of a body 13 for effecting screw engagement with the nut 57.

The shapes of the structures of various portions shown in the above-described embodiments and their modifications shall be construed as examples used in practicing the present invention, and shall not be construed that the scope of the present invention is limited thereby.

What is claimed is:

1. A mounting structure for a vanity mirror in which the vanity mirror is mounted to a sun visor, said mounting structure comprising:
   two screw holes formed in said sun visor;
   two screw penetration holes formed in a lamp section of the vanity mirror;
   positive and negative contacts for supplying a light source in the lamp section with electricity, said positive and negative contacts being formed with through holes and being disposed such that each of the through holes formed in said positive and negative contacts is aligned with a corresponding one of said screw penetration holes of the lamp section;
   two contacts provided on the sun visor and connected to a power source, said sun visor contacts being formed with through holes and being positioned such that each of the through holes of the sun visor contacts is aligned with a corresponding one of said screw holes in the sun visor which are located at positions corresponding to said screw penetration holes of the lamp section;

two mounting screws made of a conductive material which are passed through the through holes of the contacts of the lamp section, the screw penetration holes of the vanity mirror and the through holes of the contacts on the sun visor, in this order, and are screwed to the screw holes in the sun visor, whereby the contacts of the lamp section and the contacts on the sun visors are electrically connected to each other through said mounting screws; and anti-rotation means formed on the sun visor and the contacts respectively, said anti-rotation means engaging with each other to prevent the rotation of the contacts relative to the sun visor.

2. The mounting structure for a vanity mirror according to claim 1, wherein said screw penetration holes of the contacts are formed respectively with contact claws and said claws strongly engage or bit into root portions of threads of the mounting screws when said mounting screws are attached, thereby securing the electrical contacts between said mounting screws and contacts.

3. The mounting structure for a vanity mirror according to claim 1, wherein said screw penetration holes are formed to have a diameter smaller than crest diameter of said mounting screws but larger than root diameter of said mounting screws, thereby edges of said screw penetration holes securely contact the threads of said mounting screws.

4. A mounting structure for a vanity mirror in which the vanity mirror is mounted to a sun visor, said mounting structure comprising:

two screw holes formed in said sun visor;

two screw penetration holes formed in a lamp section of the vanity mirror;

positive and negative contacts for supplying a light source in the lamp section with electricity, said positive and negative contacts being formed with through holes and being disposed such that each of the through holes formed in said positive and negative contacts is aligned with a corresponding one of said screw penetration holes of the lamp section;

two contacts provided on the sun visor and connected to a power source, said sun visor contacts being formed with through holes and being positioned such that each of the through holes of the sun visor contacts is aligned with a corresponding one of said screw holes in the sun visor which are located at positions corresponding to said screw penetration holes of the lamp section; and two mounting screws made of a conductive material which are passed through the through holes of the contacts of the lamp section, the screw penetration holes of the vanity mirror and the through holes of the contacts on the sun visor, in this order, and are screwed to the screw holes in the sun visor, whereby the contacts of the lamp section and the contacts on the sun visors are electrically connected to each other through said mounting screws; and wherein said contacts are fitted onto bosses of said sun visor such that slits of said contacts are engaged with ribs of the bosses to prevent the rotation of said contacts relative to the bosses.

5. A mounting structure for a vanity mirror in which the vanity mirror is mounted to a sun visor, said mounting structure comprising:

two screw holes formed in said sun visor;

two screw penetration holes formed in a lamp section of the vanity mirror;

positive and negative contacts for supplying a light source in the lamp section with electricity, said positive and negative contacts being formed with through holes and being disposed such that each of the through holes formed in said positive and negative contacts is aligned with a corresponding one of said screw penetration holes of the lamp section;

two contacts provided on the sun visor and connected to a power source, said sun visor contacts being formed with through holes and being positioned such that each of the through holes of the sun visor contacts is aligned with a corresponding one of said screw holes in the sun visor which are located at positions corresponding to said screw penetration holes of the lamp section; and two mounting screws made of a conductive material which are passed through the through holes of the contacts of the lamp section, the screw penetration holes of the vanity mirror and the through holes of the contacts on the sun visor, in this order, and are screwed to the screw holes in the sun visor, whereby the contacts of the lamp section and the contacts on the sun visors are electrically connected to each other through said mounting screws; and wherein each of contacts is made of a conductive material and has a main portion having a nearly disk-like shape, and three leg portions extending in a same direction from roughly equally spaced three positions on a peripheral edge of a main portion, each of the leg portions being curved to have a wavy shape, the main portion being formed with said screw penetration hole and contact claws are formed at each of said screw penetration holes.

6. A mounting structure for a vanity mirror in which the vanity mirror is mounted to a sun visor, said mounting structure comprising:

two screw holes formed in said sun visor;

two screw penetration holes formed in a lamp section of the vanity mirror;

positive and negative contacts for supplying a light source in the lamp section with electricity, said positive and negative contacts being formed with through holes and being disposed such that each of the through holes formed in said positive and negative contacts is aligned with a corresponding one of said screw penetration holes of the lamp section;

two contacts provided on the sun visor and connected to a power source, said sun visor contacts being formed with through holes and being positioned such that each of the through holes of the sun visor contacts is aligned with a corresponding one of said screw holes in the sun visor which are located at positions corresponding to said screw penetration holes of the lamp section; and two mounting screws made of a conductive material which are passed through the through holes of the contacts of the lamp section, the screw penetration holes of the vanity mirror and the through holes of the contacts on the sun visor, in this order, and are screwed to the screw holes in the sun visor, whereby the contacts of the lamp section and the contacts on the sun visors are electrically connected to each other through said mounting screws; and wherein said contact on the sun visor side and said sun visor are provided with bosses each having a roughly cylindrical shape and two parallel walls extending in an axial direction are projected from outer side surfaces of said bosses, each of said contacts being made of a conductive material and having a base portion and two leg portions which extend in the same direction from two opposing positions on an edge of the main portion, the main portion being formed with said screw penetration hole and two contact claws are formed in each of said screw penetration holes.

7. A mounting structure for a vanity mirror in which the vanity mirror is mounted to a sun visor, said mounting structure comprising:

two nuts fixed to the sun visor;
two screw penetration holes formed in a lamp section of the vanity mirror;
positive and negative contacts for supplying a light source in the lamp section with electricity, said positive and negative contacts being formed with through holes and being disposed such that each of the through holes formed in said positive and negative contacts is aligned with a corresponding one of said screw penetration holes of the lamp section;
two contacts provided on the sun visor and connected to a power source, said sun visor contacts being formed with through holes and being positioned such that each of the through holes of the sun visor contacts is aligned with a corresponding one of said nuts fixed to the sun visor; and
two mounting screws made of a conductive material which are passed through the through holes of the contacts of the lamp section, the screw penetration holes of the vanity mirror and the through holes of the contacts on the sun visor, in this order, and are screwed to the nuts on the sun visor, whereby the contacts of the lamp section and the contacts on the sun visors are electrically connected with each other through said mounting screws.

8. The mounting structure for a vanity mirror according to claim 7, wherein said nut is bonded with an adhesive to the bottom surface of a depression of said sun visor, said contact is composed of a round type terminal, and a conductor is connected thereto.

9. The mounting structure for a vanity mirror according to claim 7, wherein said contact is flat and has a hexagonal and cylindrical shape having a bottom, and said screw penetration hole is formed at the center of the bottom portion thereof and said contact claws are projected from two opposing positions on the periphery of said screw penetration hole in inward directions to approach with each other, a conductor being connected to said contact.

10. The mounting structure for a vanity mirror according to claim 7, wherein said contact is made of a conductive material and has a base portion having an oval shape and two leg portions which extend in the same direction from two opposing positions on the edge of the main portion, said main portion being formed with said screw penetration hole and two contact claws being formed at each of said screw penetration holes.

11. A mounting structure for a vanity mirror in which the vanity mirror is mounted to a sun visor, said mounting structure comprising:

two screw penetration holes formed in a lamp section of the vanity mirror;
positive and negative contacts for supplying a light source in the lamp section with electricity, said positive and negative contacts being formed with through holes and being disposed such that each of the through holes formed in said positive and negative contacts is aligned with a corresponding one of said screw penetration holes of the lamp section;
two nuts attached to the sun visor via two contacts with through holes connected to a power source to be positioned at positions corresponding to said screw penetration holes of the lamp section; and
two mounting screws made of a conductive material which are passed through the through holes of the contacts of the lamp section, the screw penetration holes of the vanity mirror and the through holes of the contacts on the sun visor, in this order, and are screwed to the nuts on the sun visor, whereby the contacts of the lamp section and the contacts on the sun visors are electrically connected to each other through said mounting screws.

12. The mounting structure for a vanity mirror according to claim 11, wherein each of said contacts has two arm portions to form a nearly L-like shape and said nut is spot-welded on the end portion of one of the arm portions thereof, and a conductor is connected to the other arm portion.

13. The mounting structure for a vanity mirror according to claim 11, wherein said contact is engaged with engagement grooves formed in protrusions protruded from a bottom surface of a depression of said sun visor so that said contact is assembled on said sun visor.

* * * * *